United States Patent
Kim

(10) Patent No.: US 8,335,137 B2
(45) Date of Patent: Dec. 18, 2012

(54) OPTICAL DISK APPARATUS AND METHOD OF PERFORMING LEAD-IN PROCESS THEREOF

(75) Inventor: Sang-wan Kim, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/897,917

(22) Filed: Oct. 5, 2010

(65) Prior Publication Data

US 2011/0080816 A1      Apr. 7, 2011

Related U.S. Application Data

(60) Provisional application No. 61/248,559, filed on Oct. 5, 2009.

(51) Int. Cl.
   *G11B 7/00*        (2006.01)

(52) U.S. Cl. .................... 369/44.26; 369/53.37

(58) Field of Classification Search ............... 369/44.26, 369/53.37
See application file for complete search history.

(56) References Cited

U.S. PATENT DOCUMENTS

| | | | | |
|---|---|---|---|---|
| 7,051,054 | B1 * | 5/2006 | Lee et al. | 1/1 |
| 2002/0159369 | A1 * | 10/2002 | Tol et al. | 369/59.25 |
| 2010/0232274 | A1 * | 9/2010 | Tsai et al. | 369/53.2 |

* cited by examiner

*Primary Examiner* — Latanya Bibbins
(74) *Attorney, Agent, or Firm* — Stanzione & Kim, LLP

(57) ABSTRACT

An optical disk apparatus and a method of performing a lead-in process with respect to an optical disk thereof includes a feature where an optical pickup unit reads out information recorded on a file system area of the storage area of the optical disk, and performs a lead-in process using the read-out file system if information recorded on a lead-in area of a storage area of the optical disk cannot be read out. Further, the optical disk apparatus may perform the lead-in process with respect to the optical disk even if there is a defect in the lead-in area.

24 Claims, 10 Drawing Sheets

OPTICAL DISK APPARATUS AND METHOD OF PERFORMING LEAD-IN PROCESS THEREOF

CROSS-REFERENCE TO RELATED APPLICATIONS

This application claims priority under 35 U.S.C. §119 from U.S. Provisional Application No. 61/248,559, filed on Oct. 5, 2009, in the United States Patent and Trademark Office, and Korean Patent Application No. 10-2010-0064925, filed on Jul. 6, 2010, in the Korean Intellectual Property Office, the disclosure of which is incorporated herein by reference in its entirety.

BACKGROUND

1. Field of the Invention

The present general inventive concept generally relates to an optical disk apparatus and a method of performing a lead-in process thereof, and more particularly, to an optical disk apparatus which can perform a lead-in process to know a structure of an optical disk even if there is a defect in a lead-in area of the optical disk, and a method of performing a lead-in process thereof.

2. Description of the Related Art

An optical disk apparatus goes through a lead-in process prior to loading data of an optical disk. The lead-in process recited herein refers to a process of loading fundamental recording information of an optical disk. During the lead-in process, the optical disk apparatus loads a lead-in area recorded on the optical disk.

If information is recorded on the optical disk normally, the optical disk apparatus reads out a type of media, a start address and an end address of a data area, presence/absence of a next border or session, and encryption information (content scrambling system (CSS)/content protection of recordable media (CPRM)/advanced access content system (AACS)) from the lead-in area.

However, if there is a defect in the lead-in area of the optical disk, the optical disk apparatus is not able to load the optical disk normally even in the absence of a defect in the data area.

If the optical apparatus is used only to reproduce data, it may overrun in a non-recording area due to a characteristic of an optical pickup device and thus there may be a physical defect in the optical pickup device if the end address of the disk is not known.

The optical disk apparatus is not able to reproduce data of the optical disk normally without correct lead-in information. Therefore, there is a need to perform a normal lead-in process if there is a defect in the lead-in area.

SUMMARY

The present general inventive concept provides an optical disk apparatus which has an optical pickup unit to read out information recorded on a file system area of a storage area of an optical disk, if information of a lead-in area of the storage area cannot be read out, and perform a lead-in process using the read-out file system, and a method of performing a lead-in process thereof.

Additional embodiments of the present general inventive concept will be set forth in part in the description which follows and, in part, will be obvious from the description, or may be learned by practice of the general inventive concept.

The foregoing and/or other features and utilities of the present general inventive concept may be achieved by an optical disk apparatus, including: an optical pickup unit to read out data recorded on an optical disk, and a controller to control the optical pickup unit to read out information recorded on a file system area of a storage area of the optical disk, if information recorded on a lead-in area of the storage area of the optical disk cannot be read out, and to perform a lead-in process using the read-out file system information.

The controller may detect a location of the file system area using an indicator indicating the file system area.

The controller may calculate a size of a content area of the optical disk using the information recorded on the file system area, and generate lead-in information using the calculated size of the content area.

The lead-in information may include information about at least one of a size and a location of a content area of the storage area of the optical disk.

The optical disk may include a plurality of sub-data areas in the storage area, and each sub-data area may include a file system area. The controller may calculate a start address and an end address of each sub-data area using information recorded on the file system area included in each sub-data area.

The sub-data area may be either one of a border area and a session area.

After having finished a lead-in process of a first sub-data area, the controller may detect whether an indicator of a file system of a second sub-data area, which follows the first sub-data area, exists at a point distanced from an end point of the first sub-data area by a first size which corresponds to a standard of a first type of optical disk, and if there is a corresponding indicator, the controller may read out a file system corresponding to the second sub-data area and generates lead-in information of the second sub-data area.

If no indicator of the file system of the second sub-data area exists at the point distanced from the end point of the first sub-data area by the first size, the controller may calculate a second size according to a standard of a second type of optical disk, and detect whether an indicator of the file system of the second sub-data area exists at a point distanced from the end point of the first sub-data area by the calculated second size, and if there is a corresponding indicator, the controller may read out information recorded on a file system corresponding to the second sub-data area and generates lead-in information of the second sub-data area.

If no indicator of the file system of the second sub-data area exists at the point distanced from the end point of the first sub-data area by the second size, the controller may determine that the first sub-data area is a final sub-data area and finish the lead-in process.

The standard of the first type of optical disk may be a DVD+R standard, and the standard of the second type of optical disk may be a DVD−R standard.

The foregoing and/or other features and utilities of the present general inventive concept may also be achieved by a method of performing a lead-in process with respect to an optical disk, the method including: determining whether it is possible that information recorded on a lead-in area of a storage area of the optical disk is read out, if it is not possible that the information recorded on the lead-in area is read out, reading out information recorded on a file system area of the storage area of the optical disk, and performing a lead-in process using the read-out file system information.

The reading out may include reading out a location of the file system area using an indicator indicating the file system area.

The performing the lead-in process may include: calculating a size of a content area of the optical disk using the information recorded on the file system area, and performing a lead-in process by generating lead-in information using the calculated size of the content area.

The lead-in information may include information about either one of a size and a location of a content area of the storage area of the optical disk.

The optical disk may include a plurality of sub-data areas in the storage area, and each sub-data area includes a file system area, and the performing the lead-in process may include calculating a start address and an end address of each sub-data area using information recorded on the file system area included in each sub-data area.

The sub-data area may be either one of a border area and a session area.

The performing the lead-in process may include: performing a lead-in process of a first sub-data area, after having finished the lead-in process of the first sub-data area, detecting whether an indicator of a file system of a second sub-data area, which follows the first sub-data area, exists at a point distanced from an end point of the first sub-data area by a first size corresponding to a standard of a first type of optical disk, and if there is a corresponding indicator, reading out information recorded on a file system corresponding to the second sub-data area and generating lead-in information of the second sub-data area.

The performing the lead-in process may include: if no indicator of the file system of the second sub-data area exists at the point distanced from the end point of the first sub-data area by the first size, calculating a second size according to a standard of a second type of optical disk, detecting whether an indicator of the file system of the second sub-data area exists at a point distanced from the end point of the first sub-data area by the calculated second size, and if there is a corresponding indicator, reading out information recorded on the file system corresponding to the second sub-data area and generating lead-in information regarding the second sub-data area.

The performing the lead-in process may further include, if no indicator of the file system of the second sub-data area exists at the point distanced from the end point of the first sub-data area by the second size, determining that the first sub-data area is a final sub-data area and finishing the lead-in process.

The standard of the first type of optical disk may be a DVD+R standard, and the standard of the second type of optical disk may be a DVD−R standard.

In another feature, an optical disk apparatus includes an optical pickup unit to read out data recorded on an optical disk having a plurality of sub-data areas, and a controller to determine whether the optical disk is based on one of a first standard or a second standard different from the first standard and to operate in a first mode in response to determining the first standard to detect the plurality of sub-data areas and to operate in a second mode different from the first mode in response to determining the second standard to detect the plurality of sub-data areas.

As described above, according to various exemplary embodiments, if information recorded on the lead-in area of the storage area of the optical disk cannot be read out, the optical pickup unit reads out information recorded on the file system area of the storage area of the optical disk, and performs the lead-in process using the read-out file system. Accordingly, the optical disk apparatus can perform the lead-in process with respect to the optical disk even if there is a defect in the lead-in area. In particular, since lead-in information is re-generated using the file system, the optical disk apparatus can perform the lead-in even if the optical disk includes multi borders or multi sessions.

BRIEF DESCRIPTION OF THE DRAWINGS

These and/or other embodiments of the present general inventive concept will become apparent and more readily appreciated from the following description of the embodiments, taken in conjunction with the accompanying drawings of which.

DETAILED DESCRIPTION OF THE EMBODIMENTS

Figure 1:
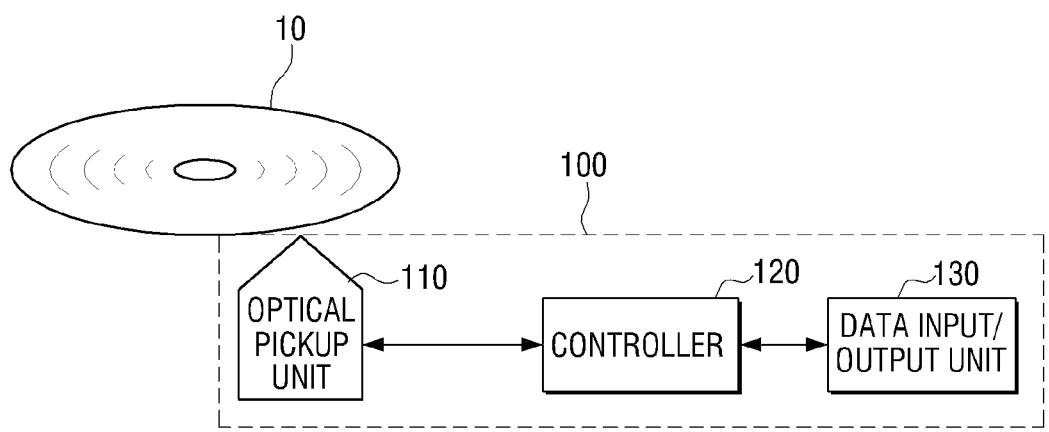
FIG. 1 is a block diagram illustrating an optical disk apparatus according to an exemplary embodiment.

Reference will now be made in detail to exemplary embodiments of the present general inventive concept, examples of which are illustrated in the accompanying drawings, wherein like reference numerals refer to like elements throughout. The exemplary embodiments are described below in order to explain the present general inventive concept by referring to the figures.

FIG. 1 is a block diagram illustrating an optical disk apparatus 100 according to an exemplary embodiment. As shown in FIG. 1, the optical disk apparatus 100 includes an optical pickup unit 110, a controller 120, and a data input/output unit 130.

The optical pickup unit 110 reads out data recorded on an optical disk 10. More specifically, the optical pickup unit 110 irradiates light toward a surface of the optical disk 10 and detects the light reflected from the surface of the optical disk 10, thereby reading out data recorded on the optical disk 10. Also, the optical pickup unit 110 may record data on the optical disk 10.

The optical disk 10 refers to a disk that records data using light. The optical disk 10 includes, but is not limited to, a compact disk (CD), a digital versatile disk (DVD) and a Blue-ray disk (BD). Further, the optical disk may be formatted according to a recording format including, but not limited to, CD-R, DVD−R, DVD+R, and BD-RE. In addition, the optical disk 10 may include various areas and/or sub-data areas to store data, including, but not limited to, a lead-in (LI) area, a lead-out (LO) area, a file system area, a border-in (BI) area, a border-out (BO) area, and a contents area. These areas area discussed in greater detailed below.

The controller 120 controls overall operation of the optical disk apparatus 100. More specifically, the controller 120 controls the data input/output unit 130 to output the data read out by the optical pickup unit 110. Also, the controller 120 controls the optical pickup unit 110 to record data input through the data input/output unit 130 on the optical disk 10.

The controller 120 also controls the optical pickup unit 110 to read out data from a lead-in area of the optical disk 10 in preparation to read out data from the optical disk 10. The controller 120 determines whether the data read out from the lead-in area by the optical pickup unit 110 is normal data or not. That is, the controller 120 may determine whether the data read out from the lead-in area includes an error, as discussed in greater detail below.

If the data of the lead-in area is normal data, i.e., no error exists in the lead-in area data, the controller 120 performs a lead-in process using the lead-in information read out from the lead-in area. The lead-in information recited herein refers to information regarding the optical disk 10, which is recorded on the lead-in area of the optical disk 10, and includes a type of optical disk, a start address and an end address of a sub-data area, presence/absence of a next border or session, and encryption information (CSS/CPRM/AACS). The lead-in process refers to a process of identifying a physical and logical structure of an optical disk at the time of loading the optical disk initially.

Figure 5:
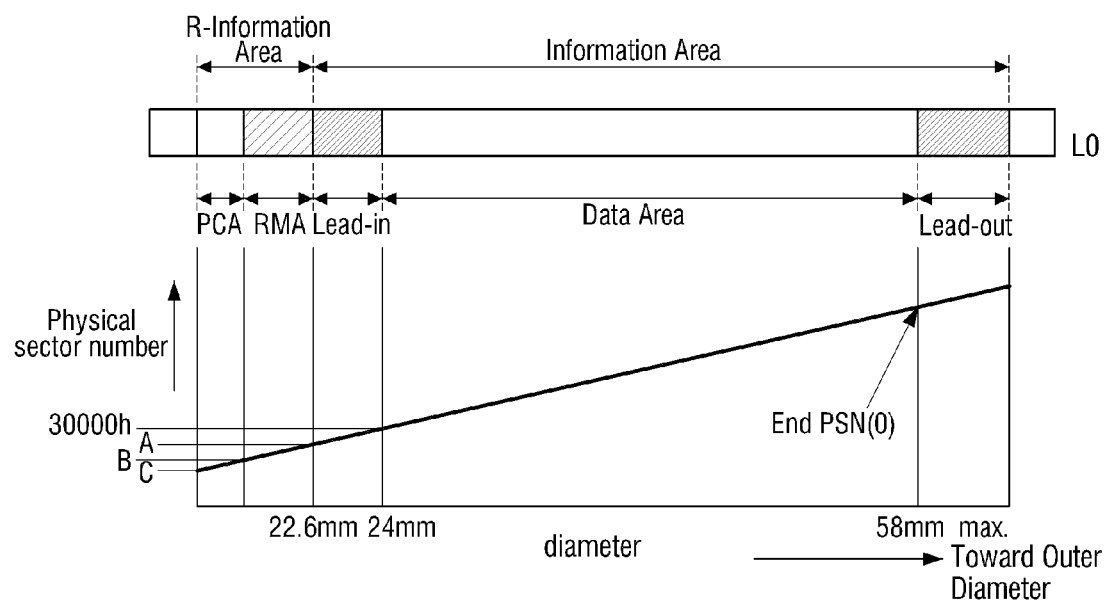
FIG. 5 is a view illustrating a storage area of a DVD−R according to an exemplary embodiment.

The sub-data area refers to each of a plurality of areas divided from a data area of the optical disk 10. The data area of the optical disk 10 is illustrated in FIG. 5.

However, if information recorded on the lead-in area of the storage area of the optical disk 10 includes an error and/or cannot be read out (i.e., if the data on the lead-in area is abnormal data), the controller 120 controls the optical pickup unit 110 to read out information recorded on a file system area of the storage area of the optical disk 10 based on a location indicator included on the optical disk, as discussed in greater detail below. The file system area is a different area than the lead-in area such that an error existing in the lead-in area may be absent from file system area. Additionally, the controller 120 may perform a lead-in process by regenerating lead-in information using the read-out file system information.

Herein, the file system area refers to an area that is located in a start portion and an end portion of each content area. The file system area includes an indicator recorded therein that indicates various characteristics of the disk 12, including a current location of a file system area, information of a type of file system, and a size of contents recorded on the content area, such as a file size, a partition size, and a volume size. Accordingly, the file system area is included in the start portion and the end portion of one content area.

The indicator recited herein may indicate that a current location is where the file system area is recorded. For example, the indicator may be an anchor pointer. Accordingly, the controller 120 may detect the location of the file system area using the indicator.

The file system information retrieved from the file system area may describe the method in which data is stored and organized on the optical disk. The type of file system may be, but is not limited to, a universal disk format (UDF).

The controller 120 may calculate a size of the content area corresponding to the file system information using the information recorded on the file system area. Also, the controller 120 may regenerate lead-in information using the calculated size of the content area. That is, the controller 120 calculates a start address and an end address of the content area, and calculates a start address and an end address of the sub-data area using the start address and the end address of the content area. Accordingly, the lead-in information includes information regarding at least one of the size and the location of the content area.

As described above, the optical disk 10 includes at least one sub-data area in the storage area. Each sub-data area may include the content area and the file system area located in the start portion and the end portion of the content area. Also, the controller 120 may calculate the start address and the end address of each sub-data area using the information recorded on the file system included in each sub-data area.

The sub-data area may indicate at least one of one of a border area and a session area according to the format of the optical disk 10. For example, if the optical disk 10 is a DVD–R, then the sub-data area is the border area. If the optical disk 10 is a DVD+R, then the sub-data area is the session area.

If the optical disk 10 is a DVD including a plurality of sub-data areas, the controller 120 performs a lead-in process with respect to one sub-data area and then searches for a next sub-data area. Since the DVD+R and the DVD–R have an area of different sizes between the two sub-data areas, the controller 120 searches for a next sub-data area using different methods with respect to the DVD+R and the DVD–R. More specifically, in the DVD+R, the area between the two sub-data areas has a fixed size, whereas in the DVD–R, the area between the two sub-data areas has a variable size.

If it is unclear which of the DVD+R and the DVD–R the type of the optical disk 10 is, the controller 120 may automatically determine that the optical disk 10 is the DVD+R and then searches for the next sub-data area. More specifically, the controller 120 finishes the lead-in process for a first sub-data area and then determines whether an indicator indicating a file system of a second sub-data area, which follows the first sub-data area, exists at a point distanced from an end point of the first sub-data area by a first size. The location of the indicator may be expressed by "an end address value of the first sub-data area+first size+0×100".

As described above, if there is an indicator in a corresponding location after determining that the optical disk 100 is a DVD+R, the controller 120 confirms that the current optical disk 100 is the DVD+R, reads out the file system corresponding to the second sub-data area, and generates lead-in information of the second sub-data area.

On the other hand, if no indicator exists in the corresponding location after initially determining that the optical disk 10 is the DVD+R (i.e., if there is no indicator at the point distanced from the end point of the first sub-data area by the first size), the controller 120 recognizes that the optical disk 10 is instead a DVD–R, and calculates a second size according to a DVD–R standard. The second size indicates a size of an area between the two sub-data areas calculated according to the DVD–R standard.

Then, the controller 120 detects whether an indicator indicating the file system of the second sub-data area exists at a point distanced from the end point of the first sub-data area by the calculated second size. If there is an indicator in a corresponding location, the controller 120 reads out information recorded on the file system corresponding to the second sub-data area and generates lead-in information of the second sub-data.

On the other hand, if no indicator indicating the file system of the second sub-data area exists at the point distanced from the end point of the first sub-data area by the second size, the controller 120 determines that the first sub-data area is a final sub-data area and finishes the lead-in process.

Based on the above-described process, the controller 120 can perform the lead-in process with respect to the plurality of sub-data areas of the optical disk of the DVD+R and/or the DVD−R standards, even if there is a defect in the lead-in area.

The data input/output unit 130 is an interface connected to an external device and exchanges data with the external device. The data input/out unit 130 may be realized by diverse AN interfaces, such as digital visual interface (DVI), S-video, high-definition multimedia (HDMI).

The optical disk apparatus 100 described above can perform the lead-in process using the file system information included in the sub-data area even if there is a defect in the lead-in area of the optical disk 10. Contrary to a conventional method that uses a recording management area (RMA) area in which a loadable area is used only in an optical disk apparatus to record. However, at least one exemplary embodiment of the general inventive concept may utilize an optical disk apparatus to both record data and read data since the file system information included in the sub-data area is used. Also, in at least one exemplary embodiment, since the file system information included in each sub-data area is used, an optical disk of multi-session or multi-border may be applied.

Figure 2:
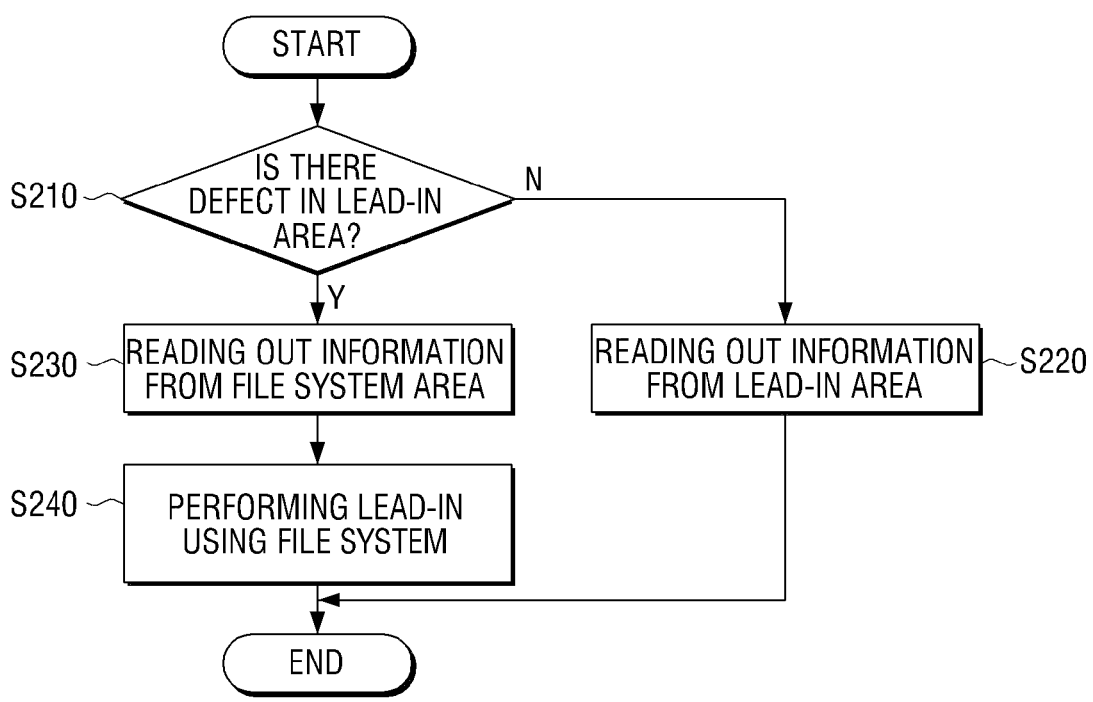
FIG. 2 is a flowchart illustrating a method of performing a lead-in process of an optical disk according to an exemplary embodiment.

Hereinafter, a method of performing a lead-in process of an optical disk of the optical disk apparatus 100 will be explained with reference to FIGS. 2 to 4. FIG. 2 is a flowchart illustrating a method of performing a lead-in process of an optical disk according to an exemplary embodiment.

As shown in FIG. 2, the optical disk apparatus 100 determines whether there is a defect in the lead-in area of the optical disk 10 (S210). If the lead-in area of the optical disk is normal (S210-N), the optical disk apparatus 100 reads out information from the lead-in area and performs a lead-in process using the read-out lead-in information (S220). The lead-in information is information about the optical disk 10 which is recorded on the lead-in area, and includes a type of optical disk, a start address and an end address of a sub-data area, presence/absence of a next border or session, and encryption information (CSS/CPRM/AACS).

On the other hand, if the information recorded on the lead-in area of the storage area of the optical disk 10 cannot be read-out (i.e., if the data of the lead-in area includes an error or abnormal data) (S210-N), the optical disk 100 reads out information recorded on a file system area of the storage area of the optical disk 10 (S230). The optical apparatus 100 performs a lead-in process by regenerating lead-in information using the read-out file system (S240).

The file system area is located in a start portion and an end portion of each content area. Also, the file system area records an indicator indicating that a current location corresponds to the file system area, information about a type of file system, and a size of contents recorded on the content area (such as a file size, a partition size, and a volume size). Therefore, the file system area is included in the start portion and the end portion of one content area.

The indicator indicates that the current location is where the file system area is recorded. For example, the indicator may be an anchor pointer. Therefore, the controller 120 detects the location of the file system area using the indicator indicating the file system area.

The type of file system may be, but is not limited to, a universal disk format (UDF), as mentioned earlier.

As described above, the optical disk apparatus 100 performs a lead-in process using the file system information if there is a defect in the lead-in area, and a process thereof will be explained with reference to FIG. 3.

Figure 3:
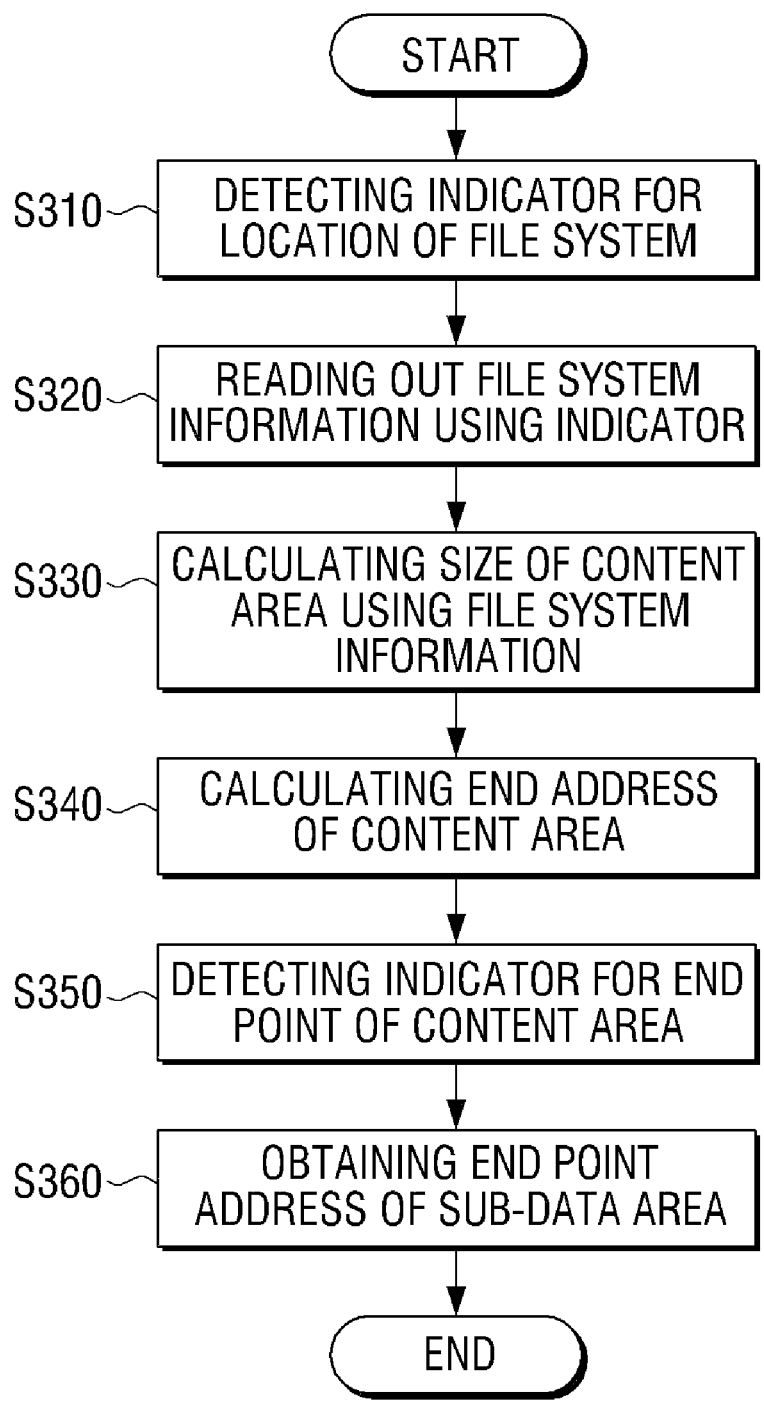
FIG. 3 is a flowchart illustrating a process of performing a lead-in process with respect to one sub-data area according to an exemplary embodiment.

FIG. 3 is a flowchart illustrating a process of performing a lead-in with respect to one sub-data area according to an exemplary embodiment.

If it is determined that there is a defect in the lead-in area of the optical disk 10, the optical disk apparatus 100 detects an indicator indicating the location of the file system (S310). The optical disk apparatus 100 recognizes the location of the file system using the detected indicator and reads out file system information from the file system area (S320).

Then, the optical disk apparatus 100 calculates a size of a content area corresponding to the file system information using the information recorded on the file system area (S330). The optical disk apparatus 100 regenerates lead-in information using the calculated size of the content area. Therefore, the lead-in information includes information of at least one of the size and the location of the content area.

After that, the optical disk apparatus 100 detects an indicator about an end point of the content area using the size and location information of the content area (S350). The optical disk apparatus 100 obtains an address of the end point of the sub-data area using the detected indicator (S360).

The optical disk apparatus 100 calculates a start address and an end address of the content area, and calculates a start address and an end address of the sub-data area based on the calculation of the content area.

The optical disk 10 includes at least one sub-data area in the storage area. Each sub data area includes the content area and the file system area located in the start portion and the end portion of the content area. Also, the optical disk apparatus 100 calculates the start address and the end address of each sub-data area using the information recorded on the file system included in each sub data area.

The sub-data area indicates one of a border area and a session area according to a format of the optical disk 10. For example, if the optical disk 10 is a DVD−R, the sub-data area is the border area, and if the optical disk 10 is a DVD+R, the sub-data area is the session area.

If the optical disk 10 is a DVD including a plurality of sub-data areas, the controller 102 performs a lead-in process with respect to one sub-data area and then searches for a next sub-data area. Since an area between two sub-data areas in the DVD+R is different from an area between two sub-data areas in the DVD−R, the controller 120 searches for the next sub-data area using different methods with respect to the DVD+R and the DVD−R. More specifically, in the DVD+R, the area between the two sub-data areas has a fixed size. On the other hand, in the DVD−R, the area between the two sub-data areas has a variable size.

A process of performing a lead-in process with respect to the optical disk 10 including the plurality of sub-data areas described above will be explained with reference to FIG. 4. More specifically, FIG. 4 is a flowchart illustrating a process of detecting presence of a plurality of sub-data areas according to an exemplary embodiment. A first sub-data area and a second sub-data area refer to two continuous sub-data areas included in the optical disk 10. Also, it is assumed that the second sub-data area follows the first sub-data area.

The optical disk apparatus 100 performs a lead-in process with respect to the first sub-data area using file system information (S410). Thereafter, if it is unclear whether the optical disk is a DVD+R or a DVD−R, the optical disk apparatus 100 will automatically determine that the type of the optical disk 10 is the DVD+R and searches for an indicator regarding the next sub-data area (S420). More specifically, after having finished the lead-in process of the first sub-data area, the optical disk apparatus 100 detects whether an indicator indicating a file system of the second sub-data area, which follows the first sub-data area, exists at a point distanced from the end point of the first sub-data area by a first size. The location of the indicator may be expressed by "an end address of the first sub-data area +first size+0×100".

If there is an indicator in a corresponding location on the assumption that the optical disk 100 is the DVD+R (S430-Y), the optical disk 100 confirms that the current optical disk 10 is the DVD+R, reads out information recorded on the file system corresponding to the second sub-data area, and performs a lead-in process with respect to the second sub-data area by regenerating lead-in information of the second sub-data area (S440).

On the other hand, if no indicator exists in the corresponding location on the assumption that the optical disk is the DVD+R (i.e., if there is no indicator at the point distanced from the end point of the first sub-data area by the first size) (S430-N), the optical disk 100 recognizes that the optical disk is the DVD−R and searches for an indicator regarding a start point of the next sub-data area (S450). More specifically, the optical disk 100 calculates a second size according to the DVD−R standard. The second size indicates a size of an area between the two sub-data areas calculated according to the DVD−R standard. The optical disk apparatus 100 detects whether an indicator indicating a file system of the second sub-data area exists at a point distanced from the end point of the first sub data area by the calculated second size.

If there is an indicator in a corresponding location (S460-Y), the optical disk 100 reads out information recorded on the file system corresponding to the second sub-data area and performs a lead-in process by regenerating lead-in information of the second sub-data area (S440).

On the other hand, if no indicator indicating the file system of the second sub-data area exists in at the point distanced from the end point of the first sub-data area by the second size (S460-N), the optical disk apparatus 100 determines that the first sub-data area is the final sub-data area and finishes the lead-in process (S470).

Based on the above-described process, the controller 120 can perform the lead-in process with respect to the plurality of sub-data areas included in the optical disk of the DVD+R and the DVD−R standards, even if there is a defect in the lead-in area.

Figure 4:
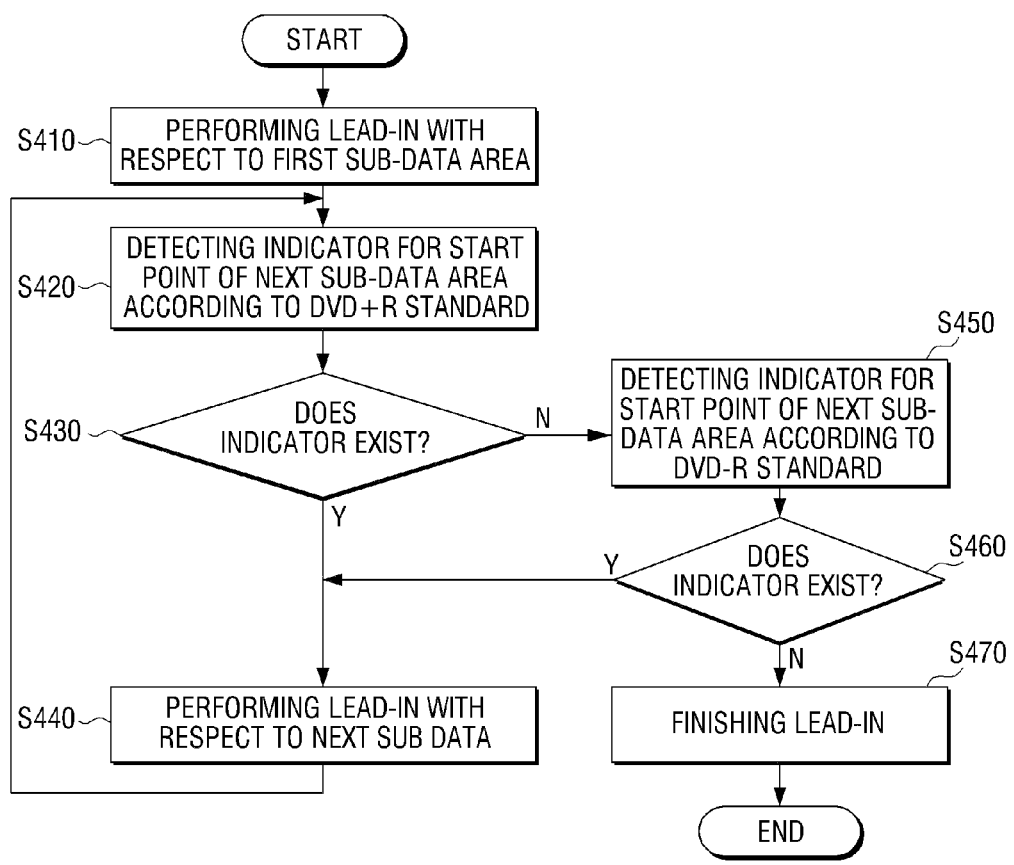
FIG. 4 is a flowchart illustrating a process of detecting presence of a plurality of sub-data areas according to an exemplary embodiment.

Referring to FIGS. 2 to 4, the optical disk apparatus 100 can perform the lead-in process using the file system information included in the sub-data area even if there is a defect in the lead-in area of the optical disk 10.

FIG. 5 is a view illustrating a storage area of a DVD−R according to an exemplary embodiment. As shown in FIG. 5, the DVD−R includes an R-information area and an information area. The R-information area is loaded only if the optical disk apparatus 100 records data on the DVD−R.

The storage area of the DVD−R complies with the standard and thus a detailed description is omitted. The term 'lead-in' in FIG. 5 indicates a lead-in area and the term 'Data Area' indicates a data area. The data area may include a plurality of sub-data areas.

Figure 6:
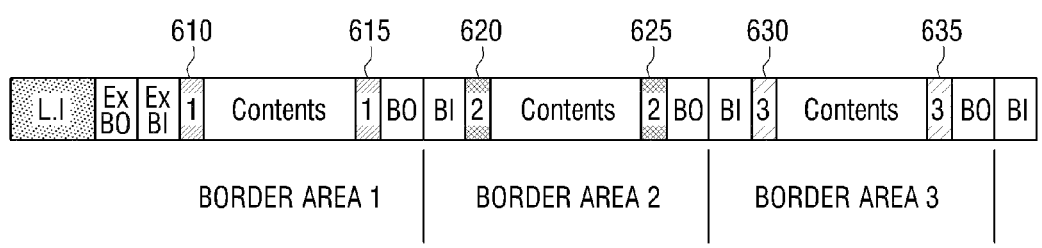
FIG. 6 is a view illustrating a storage area of a DVD−R including a plurality of borders according to an exemplary embodiment.

FIG. 6 is a view illustrating a storage area of a DVD−R including a plurality of borders according to an exemplary embodiment. The DVD−R of FIG. 6 includes three border areas. More specifically, the DVD−R includes a border area 1, a border area 2, and a border area 3.

Each border area includes a Border In (BI) area, a file start system, a content area, an end file system, and a Border Out (BO) area.

The border area 1 includes a start file system 1 610 and an end file system 1615, the border area 2 includes a start file system 2 620 and an end file system 2 625, and the border area 3 includes a start file system 3 630 and an end file system 3 635.

Figure 7:
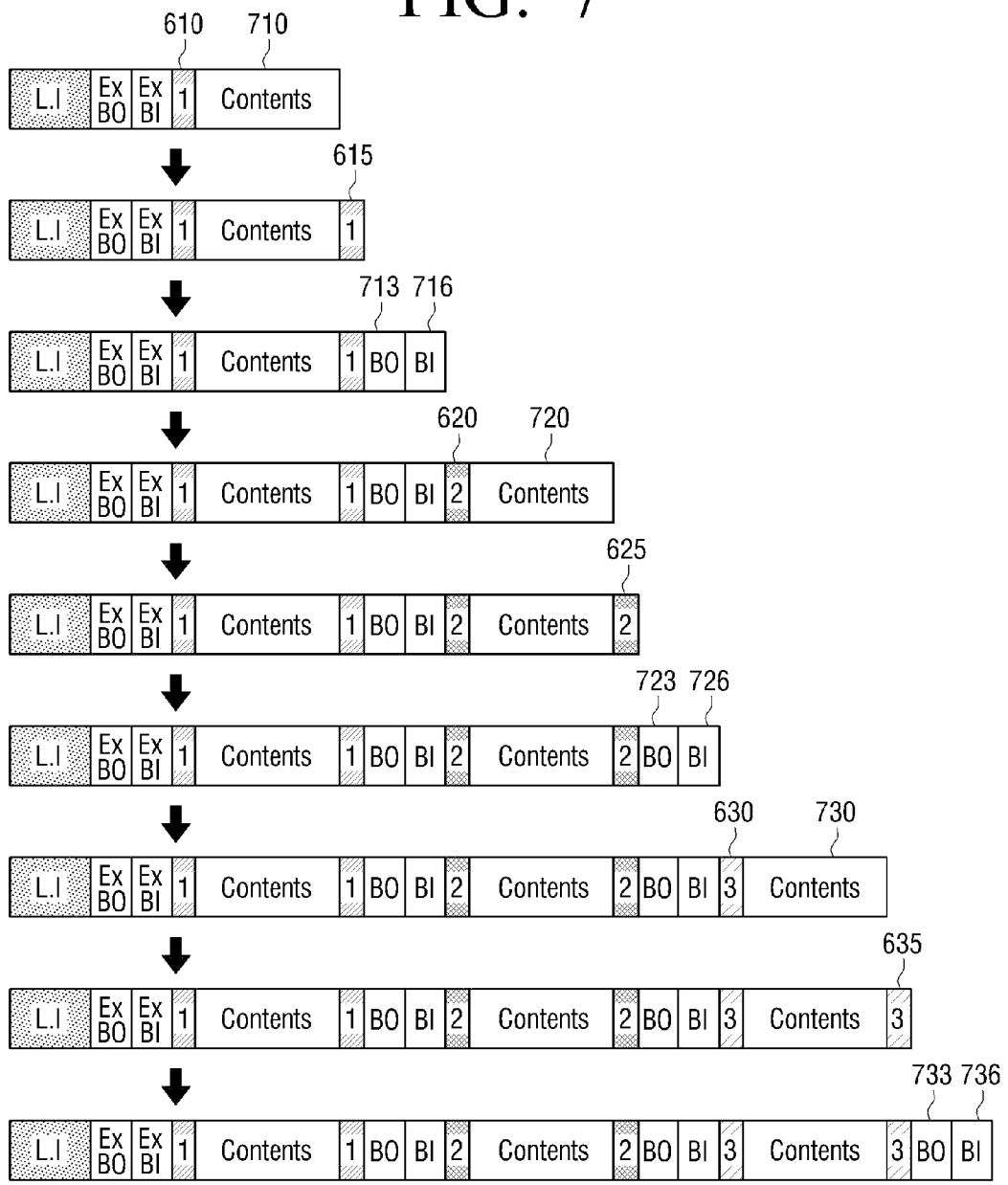
FIG. 7 is a view illustrating a process of performing a lead-in process with respect to the DVD−R including the plurality of borders according to an exemplary embodiment.

A method of performing a lead-in process with respect to the DVD−R of the above structure will be explained with reference to FIG. 7. FIG. 7 is a view illustrating a method of performing a lead-in process with respect to the DVD−R including a plurality of borders. FIG. 7 illustrates the lead-in process in sequence from the top to the bottom.

As shown in FIG. 7, the optical disk apparatus 100 performs the lead-in process with respect to the first content area 710 using the start file system 1 610 of the border area 1.

After that, the optical disk apparatus 100 reads out information from the end file system 1 615. The optical disk apparatus 100 performs the lead-in process with respect to the BO area 713 and the BI area 716 and then reads out information recorded on the start file system 2 620 of the border area 2, which is included in the second border area.

The optical disk apparatus 100 performs the lead-in with respect to the second content area 720 using the read out file system 2 620.

After that, the optical disk apparatus 100 reads out information from the end file system 2 625. The optical disk apparatus 100 performs the lead-in process with respect to a BO area 723 and a BI area 726 and then reads out information recorded on the start file system 3 630 of the border area 3 which is the third border area.

The optical disk apparatus 100 performs the lead-in process with respect to the third content area 730 using the read-out start file system 3 630. The optical disk apparatus 100 performs the lead-in process with respect to a BO area 733 and a BI area 736.

Based on the above-described process, the optical disk apparatus 100 performs the lead-in process with respect to the optical disk of the DVD−R illustrated in FIG. 6 using the file system information of each border area.

Figure 8:
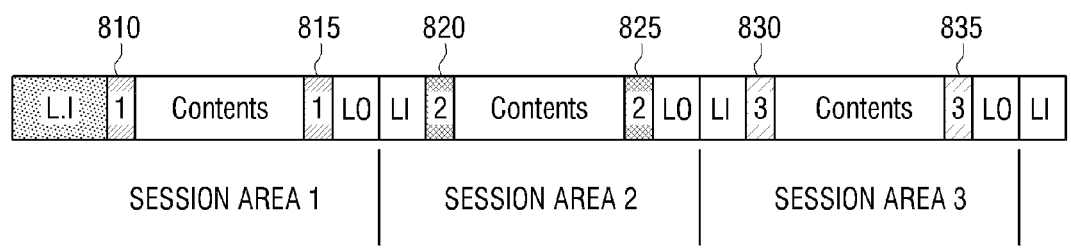
FIG. 8 is a view illustrating a storage area of a CD-R including a plurality of sessions according to an exemplary embodiment.

As another example, a CD-R will be explained with reference to FIGS. 8 and 9. FIG. 8 is a view illustrating a storage area of a CD-R including a plurality of sessions according to an exemplary embodiment.

The CD-R shown in FIG. 8 includes three sessions. More specifically, the CD-R includes a session area 1, a session area 2, and a session area 3.

Each session includes a Lead-In (LI) area, a start file system, a content area, an end file system, and a Lead Out (LO) area.

Also, the session area 1 includes a start file system 1 810 and an end file system 1 815, the session area 2 includes a start file system 2 820 and an end file system 2 825, and the session area 3 includes a start file system 3 830 and an end file system 3 835.

A process of performing a lead-in process with respect to the CD-R of the above structure will be explained with reference to FIG. 9. FIG. 9 illustrates a process of performing a lead-in process with respect to the CD-R including the plurality of sessions according to an exemplary embodiment. FIG. 9 illustrates the lead-in process in sequence from the top to the bottom.

Figure 9:
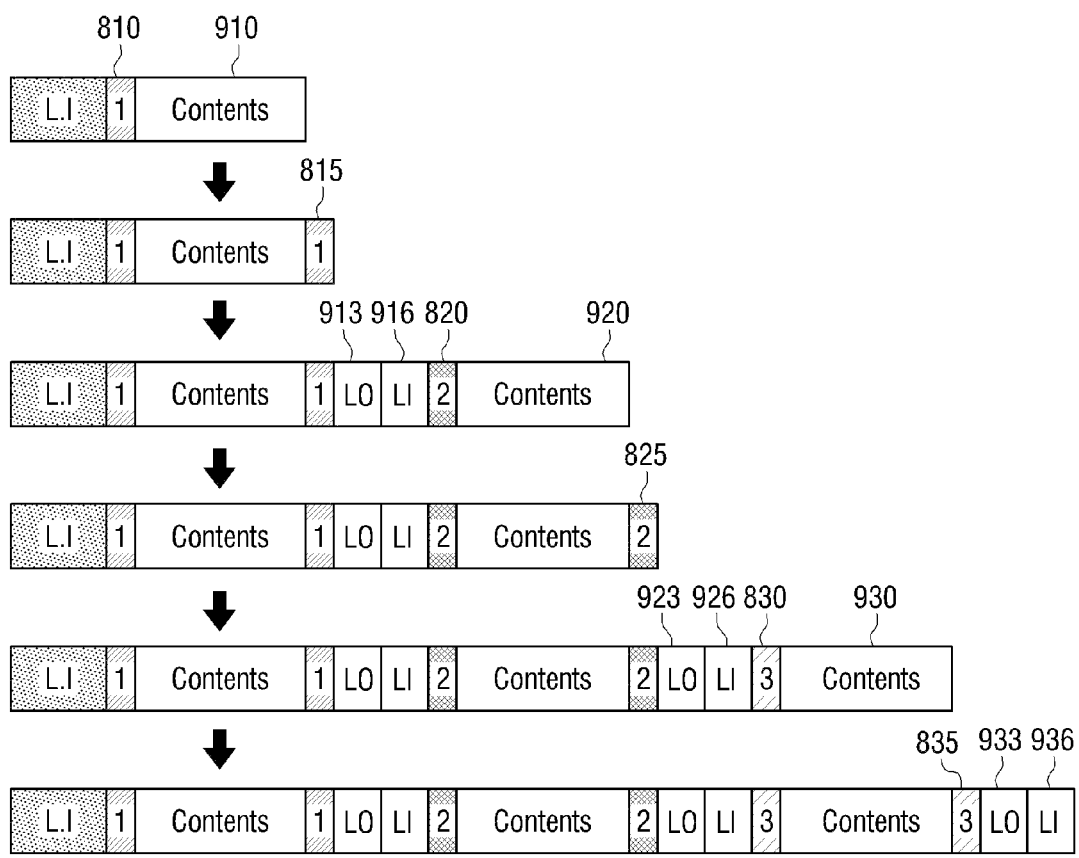
FIG. 9 is a view illustrating a process of performing a lead-in process with respect to the CD-R including the plurality of sessions according to an exemplary embodiment.

As shown in FIG. 9, the optical disk apparatus 100 performs the lead-in process with respect to a first content area 910 using the start file system 1 810 of the session area 1.

After that, the optical disk apparatus 100 reads out information recorded on the end file system 1 815. The optical disk apparatus 100 performs the lead-in process with respect to an LO area 913 and an LI area 916 and then reads out information recorded on the start file system 2 920 of the session area 2 which is the second session area.

Also, the optical disk apparatus 100 performs the lead-in process with respect to the second content area 920 using the read-out start file system 2 820.

After that, the optical disk apparatus 100 reads out information recorded on the end file system 2 825. The optical disk apparatus 100 performs the lead-in process with respect to an LO area 923 and an LI area 926 and then reads out information recorded on the start file system 3 830 of the session area 3, which is the third session area.

The optical disk apparatus 100 performs the lead-in process with respect to the third content area 930 using the read-out start file system 3 830. The optical disk 100 performs the lead-in process with respect to an LO area 933 and an LI area 936.

Through the above-described process, the optical disk 100 performs the lead-in process with respect to the optical disk of the CD-R shown in FIG. 8 using the file system information of each session area.

Figure 10:
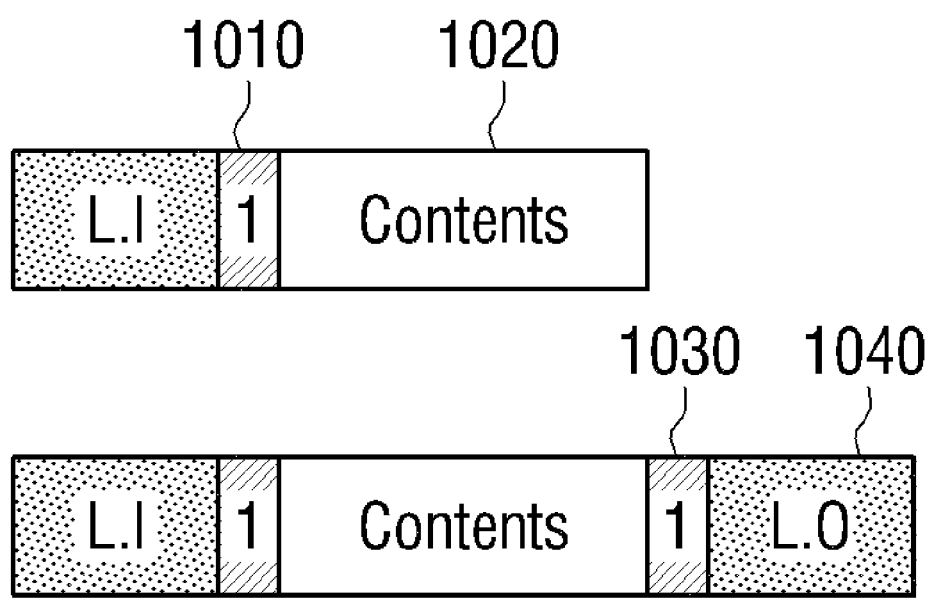
FIG. 10 is a view illustrating a process of performing a lead-in process with respect to a BD-RE according to an exemplary embodiment.

Hereinafter, an optical disk of a Blue-ray disk will be explained with reference to FIG. 10. FIG. 10 illustrates a process of performing a lead-in process with respect to the BD-RE.

As shown in FIG. 10, the BD-RE includes a single sub-data area only. Accordingly, the optical disk apparatus 100 reads out information recorded on a start file system 1010. The optical disk apparatus 100 performs the lead-in process with respect to a content area 1020 using the read-out start file system 1010. By reading out information recorded on an end file system 1030, the optical disk apparatus 100 recognizes an end point of the lead-in process and then performs the lead-in with respect to an LO area 1040.

The present general inventive concept can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.>>INSERT COMPUTER-READABLE MEDIUM PARAGRAPH HERE Based on the above-described process, the optical disk apparatus 100 can perform the lead-in process with respect to the BD-RE if there is a defect in a lead-in area.

As discussed above, the optical disk apparatus 100 may be any type of optical disk apparatus that can read and write an optical disk. For example, the optical disk apparatus 100 may be a DVD player, a CD player, a BD player, a DVD drive, a CD drive, and a BD drive.

Although a few embodiments of the present general inventive concept have been shown and described, it would be appreciated by those skilled in the art that changes may be made in these embodiments without departing from the principles and spirit of the general inventive concept, the scope of which is defined in the claims and their equivalents.

What is claimed is:

1. An optical disk apparatus, comprising:
an optical pickup unit to read out data recorded on an optical disk; and
a controller to control the optical pickup unit to read out information recorded on a file system area of a storage area of the optical disk, if information recorded on a lead-in area of the storage area of the optical disk cannot be read out, to detect an indicator included in the file system area, to determine a standard of the optical disk based on the indicator, to perform a lead-in process according to the determined standard of the optical disk based on the indicator included in the file system area, to calculate a size of a content area of the optical disk using the information recorded on the file system area, and to generate lead-in information using the calculated size of the content area.

2. The optical disk apparatus as claimed in claim 1, wherein the controller detects a location of the file system area using an indicator indicating the file system area.

3. The optical disk apparatus as claimed in claim 1, wherein the lead-in information comprises information about at least one of a size and a location of a content area of the storage area of the optical disk.

4. The optical disk apparatus as claimed in claim 1, wherein the optical disk comprises a plurality of sub-data areas in the storage area, and each sub-data area comprises a file system area having file system information stored thereon,
wherein the controller calculates a start address and an end address of each sub-data area using the file system information stored on the file system area included in each sub-data area.

5. The optical disk apparatus as claimed in claim 4, wherein the sub-data area is either one of a border area and a session area.

6. The optical disk apparatus as claimed in claim 1, wherein, after having finished a lead-in process of a first sub-data area, the controller detects whether an indicator of a file system of a second sub-data area, which follows the first sub-data area, exists at a point distanced from an end point of the first sub-data area by a first size which corresponds to a standard of a first type of optical disk, and if there is a corresponding indicator, the controller reads out a file system corresponding to the second sub-data area and generates lead-in information of the second sub-data area.

7. The optical disk apparatus as claimed in claim 6, wherein, if no indicator of the file system of the second sub-data area exists at the point distanced from the end point of the first sub-data area by the first size, the controller calculates a second size according to a standard of a second type of optical disk, and detects whether an indicator of the file system of the second sub-data area exists at a point distanced from the end point of the first sub-data area by the calculated second size, and if there is a corresponding indicator, the controller reads out information recorded on a file system corresponding to the second sub-data area and generates lead-in information of the second sub-data area.

8. The optical disk apparatus as claimed in claim 7, wherein, if no indicator of the file system of the second sub-data area exists at the point distanced from the end point of the first sub-data area by the second size, the controller determines that the first sub-data area is a final sub-data area and finishes the lead-in process.

9. The optical disk apparatus as claimed in claim 7, wherein the standard of the first type of optical disk is a DVD+R standard, and the standard of the second type of optical disk is a DVD-R standard.

10. A method of performing a lead-in process with respect to an optical disk, the method comprising:
- determining whether information recorded on a lead-in area of a storage area of the optical disk can be read out;
- if it is not possible that the information recorded on the lead-in area can be read out, reading out information recorded on a file system area of the storage area of the optical disk;
- detecting an indicator included in the file system area and determining a standard of the optical disk based on the indicator; and
- performing a lead-in process according to the determined standard of the optical disk using the information recorded on the file system area, the performing a lead-process including calculating a size of a content area of the optical disk using the information recorded on the file system area, and performing a lead-in process by generating lead-in information using the calculated size of the content area.

11. The method as claimed in claim 10, wherein the reading out comprises reading out a location of the file system area using an indicator indicating the file system area.

12. The method as claimed in claim 10, wherein the lead-in information comprises information corresponding to at least one of a size of a content area and a location of a content area included with the storage area of the optical disk.

13. The method as claimed in claim 10, wherein the optical disk comprises a plurality of sub-data areas in the storage area, and each sub-data area comprises a file system area having file system information stored thereon,
- wherein the performing the lead-in process comprises calculating a start address and an end address of each sub-data area using the file system information stored on the file system area included in each sub-data area.

14. The method as claimed in claim 13, wherein the sub-data area is at least one of a border area and a session area.

15. The method as claimed in claim 10, wherein the performing the lead-in process comprises:
- performing a lead-in process of a first sub-data area;
- after having finished the lead-in process of the first sub-data area, detecting whether an indicator of a file system of a second sub-data area, which follows the first sub-data area, exists at a point distanced from an end point of the first sub-data area by a first size corresponding to a standard of a first type of optical disk; and
- if there is a corresponding indicator, reading out information recorded on a file system corresponding to the second sub-data area and generating lead-in information of the second sub-data area.

16. The method as claimed in claim 15, wherein the performing the lead-in process comprises:
- if no indicator of the file system of the second sub-data area exists at the point distanced from the end point of the first sub-data area by the first size, calculating a second size according to a standard of a second type of optical disk;
- detecting whether an indicator of the file system of the second sub-data area exists at a point distanced from the end point of the first sub-data area by the calculated second size; and
- if there is a corresponding indicator, reading out information recorded on the file system corresponding to the second sub-data area and generating lead-in information regarding the second sub-data area.

17. The method as claimed in claim 16, wherein the performing the lead-in process further comprises, if no indicator of the file system of the second sub-data area exists at the point distanced from the end point of the first sub-data area by the second size, determining that the first sub-data area is a final sub-data area and finishing the lead-in process.

18. The method as claimed in claim 16, wherein the standard of the first type of optical disk is a DVD+R standard, and the standard of the second type of optical disk is a DVD-R standard.

19. An optical disk apparatus, comprising:
- an optical pickup unit to read out data recorded on an optical disk having at least one of a lead-in area and a file system area; and
- a controller to process information from the file system area if information recorded on the lead-in area cannot be read out, to detect an indicator included in the file system area and determine a standard of the optical disk based on the indicator, to perform a lead-in process according to the determined standard of the optical disk corresponding to information of the lead-in area, to calculate a size of a content area of the optical disk using the information recorded on the file system area, and to generate lead-in information using the calculated size of the content area.

20. The optical disk apparatus of claim 19, wherein the file system comprises a plurality of file system areas space apart from each other and wherein the controller controls the optical pickup unit to read out information from the spaced-apart file system areas.

21. An optical disk apparatus, comprising:
- an optical pickup unit to read out data recorded on an optical disk having a plurality of sub-data areas; and
- a controller to detect an indicator included in a file system area in response to a detecting an error in a lead-in area, to determine whether the optical disk is based on one of a first standard or a second standard different from the first standard based on the indicator, and to operate in a first mode that generates lead-in information according to the first standard in response to determining the first standard to detect the plurality of sub-data areas, to operate in a second mode different from the first mode that generates a lead-in information according to the second standard in response to determining the second standard to detect the plurality of sub-data areas, and to determine the first standard as the DVD+R in response to detecting an indicator included on the optical disk existing at a location of the optical disk according to the fixed size of the DVD+R.

22. The optical disk apparatus of claim 21, wherein the controller operates in the first mode when neither the first standard nor the second standard is detected.

23. The optical disk apparatus of claim 21, wherein the first standard is a DVD+R including an area having a fixed size disposed between two sub-data areas and the second standard is a DVD-R including an area having a variable size between disposed between two sub-data areas.

24. The optical disk apparatus of claim 23, wherein the controller determines the second standard as the DVD-R when the indicator is not detected and calculates the variable size between two sub-data areas based on a pre-determined value.

* * * * *